(12) United States Patent
Balidas et al.

(10) Patent No.: US 11,278,880 B2
(45) Date of Patent: Mar. 22, 2022

(54) WATER SOFTENING DEVICE AND METHOD OF OPERATING A WATER SOFTENING DEVICE

(71) Applicant: BWT Aktiengesellschaft, Mondsee (AT)

(72) Inventors: Pierre Balidas, Bloomfield, NJ (US); Christian Brand, Brunstatt (FR); Jürgen Johann, Nußloch (DE)

(73) Assignee: BWT Aktiengesellschaft, Mondsee (AT)

( * ) Notice: Subject to any disclaimer, the term of this patent is extended or adjusted under 35 U.S.C. 154(b) by 0 days.

(21) Appl. No.: 16/473,721

(22) PCT Filed: Feb. 6, 2018

(86) PCT No.: PCT/EP2018/052952
§ 371 (c)(1),
(2) Date: Jun. 26, 2019

(87) PCT Pub. No.: WO2018/153657
PCT Pub. Date: Aug. 30, 2018

(65) Prior Publication Data
US 2019/0336960 A1     Nov. 7, 2019

(30) Foreign Application Priority Data

Feb. 23, 2017   (EP) ..................................... 17157543

(51) Int. Cl.
*B01J 49/53* (2017.01)
*B01J 47/14* (2017.01)
(Continued)

(52) U.S. Cl.
CPC ............... *B01J 49/53* (2017.01); *B01J 47/14* (2013.01); *B01J 49/85* (2017.01); *C02F 1/42* (2013.01);
(Continued)

(58) Field of Classification Search
CPC .. B01J 47/14; B01J 49/53; B01J 49/85; C02F 1/24; C02F 2001/425; C02F 2209/055; C02F 2303/16; C02F 1/42; C02F 2209/05
See application file for complete search history.

(56) References Cited

U.S. PATENT DOCUMENTS 3,246,759 A * 4/1966 Matalon ................... B01J 49/85
210/96.1
5,234,601 A    8/1993 Janke et al.
(Continued)

FOREIGN PATENT DOCUMENTS

EP    0 934 775 A1    8/1999
EP    2481713 A1 * 8/2012 ............. B01J 47/14
(Continued)

OTHER PUBLICATIONS

Kopeliovich, Ion exchange resins, Jul. 27, 2013, SubsTech (Year: 2013).*
(Continued)

*Primary Examiner* — Dirk R Bass
(74) *Attorney, Agent, or Firm* — DLA Piper LLP (US)

(57) ABSTRACT

A water softening device includes a filter configured to remove hardness from a first stream of raw water to produce a second stream of softened water. The filter includes an ion exchange material which is loaded with a first cationic ion species deriving from a tracer salt and with a second cationic ion species deriving from a regenerant salt. The IEX material shows a lower affinity to the first cationic ion species than to the hardness. At the same time the IEX material shows a higher affinity to the first cationic ion species than to the second cationic species. An electrical property of the second stream is monitored by a sensor. A change in the monitored electrical property can be used as an indicator for the exhaustion state of the filter.

16 Claims, 3 Drawing Sheets

(51) Int. Cl.
  *B01J 49/85* (2017.01)
  *C02F 1/42* (2006.01)

(52) U.S. Cl.
  CPC .. *C02F 2001/425* (2013.01); *C02F 2209/055* (2013.01); *C02F 2303/16* (2013.01)

(56) References Cited

U.S. PATENT DOCUMENTS

2001/0023841 A1  9/2001  Zimmerman et al.
2010/0140178 A1  6/2010  Yokoyama et al.

FOREIGN PATENT DOCUMENTS

| JP | H07-501746 A | 2/1995 |
| JP | 2000-126764 A | 5/2000 |
| WO | 2010/051437 A2 | 5/2010 |

OTHER PUBLICATIONS

Coury, Conductance Measurements Part 1: Theory, 1999, Current Separations, 18:3, pp. 91-96 (Year: 1999).*
Sivanandan, How to Calculate Resin Capacity for Softener | Softening Plant?, 2011, Water-Chemistry (Year: 2011).*
The Notice of Reason for Rejection dated Oct. 29, 2021, of counterpart Japanese Patent Application No. 2019-532956, along with an English Translation.

* cited by examiner

WATER SOFTENING DEVICE AND METHOD OF OPERATING A WATER SOFTENING DEVICE

TECHNICAL FIELD

This disclosure relates to a water softening device and a method of operating a water softening device.

BACKGROUND

Water softening devices often comprise a filter filled with a strong acid cationic (SAC) ion exchange (IEX) material, regenerated under the sodium form. A raw water flows through a bed of the material, where calcium and magnesium ions (the hardness causing ions or—in short—the "hardness") are exchanged against sodium ions. The exchange reaction takes place because the IEX material exhibits a higher affinity to calcium and magnesium ions than to sodium ions. The following reaction occurs during the softening step:

$$2R\text{—}SO_3\text{—}Na + Ca^{2+} \rightarrow (R\text{—}SO_3)_2\text{—}Ca + 2Na^+.$$

When all the IEX material is loaded with hardness, the capacity of the filter has been reached and the material bed needs to be regenerated back to the sodium form. The regeneration exchange reaction is accomplished by exposing the material to an excess of sodium ions to reverse the exchange equilibrium according to the following reaction:

$$(R\text{—}SO_3)_2\text{—}Ca + 2Na^+ = 2R\text{—}SO_3\text{—}Na + Ca^{2+}.$$

For a given amount of IEX material in the filter, the amount of brine used during the regeneration usually varies, depending inter alia on the application and on the IEX material capacity. For domestic applications, a regeneration with an amount of about 90 g NaCl per liter of IEX material is typical, resulting in a raw operating IEX material capacity of about 1.1 eq/l. For industrial applications, typically, the amount of brine used is about 180 g of NaCl per liter of IEX material, resulting in a raw operating IEX material capacity of around 1.5 eq/l.

For a given raw water composition and a defined volume of IEX material, the capacity or volume of raw water which can be treated with the filter can be determined according to the following equation:

$$V_{RW} = C_{IEX} * V_{IEX}/TH_{RW}$$

wherein
$V_{RW}$ is the volume of raw water to be treated [l],
$C_{IEX}$ is the specific capacity of the IEX material [eq.*l$^{-1}$]
$V_{IEX}$ is the volume of the IEX material volume in the filter [l]
$TH_{RW}$ is the total hardness ([Ca$^{2+}$]+[Mg$^{2+}$]) in the raw water [meq.*l$^{-1}$].

As a concrete example, the following parameters are typical for a domestic application:

$V_{IEX}$ 25 l $C_{IEX}$=1.1 eq.*l$^{-1}$ (regenerated with 90 g NaCl per liter IEX material)

$TH_{RW}$=5.2 meq.*l$^{-1}$.

In this example, for the capacity or volume of raw water which can be treated results:

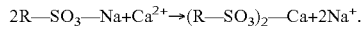
$V_{RW}$=1.1*25/5.2*10$^{-3}$=5288 l (about 5.3 m$^3$).

This means that after a volume of about 5.3 m$^3$ of raw water, the IEX material bed would be exhausted. When this capacity is reached, the IEX material should be regenerated.

In practice there are some additional parameters on which an IEX material capacity depends. Such parameters are, for example, temperature, flow speed though the material bed, influent sodium concentration compared to the total cationic load, content of total dissolved solids (TDS) in the raw water, concentration of the brine which is used during the regeneration step and the hardness level allowed at the end of the cycle. To take the influence of all those parameters into account, a safety coefficient can be applied to ensure that the regeneration is initiated prior to a hardness breakthrough.

To illustrate, in the previous example, the safety coefficient can be integrated into the $C_{IEX}$ in the form of a safety margin of 10%. For a regenerant level of 90 g of NaCl per liter of IEX material, the practical IEX material capacity to take into account would become 1.0 eq/l. For the capacity or volume of raw water that can be treated safely without the risk of a hardness breakthrough would result:

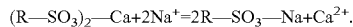
$V_{RW}$=1.0*25/5.2*10$^{-3}$=4808 l (about 4.8 m$^3$).

In this example, the filter's practical operating capacity would be set at 4.8 m$^3$. This volume corresponds to the volume of water that can be treated safely before regeneration has to be initiated. Compared to the raw operating capacity of 5.3 m$^3$ above the difference is 0.5 m$^3$.

This means that in practice the IEX material in the filter is always regenerated before its full capacity is reached and that about 10% of the operating capacity is lost in each cycle. During each regeneration, a fixed amount of brine and water are consumed. The fact the filter is not used to its full capacity results in an increased consumption of brine and water compared to an operation mode according to which the filter would be used to its full capacity.

It could therefore be helpful to prevent or at least reduce capacity loss due to regeneration of an IEX material before its full capacity is reached.

SUMMARY

We provide a water softening device including a filter configured to remove hardness from a first stream of raw water to produce a second stream of softened water, wherein the filter includes an ion exchange material, the IEX material is loaded with a first cationic ion species deriving from a tracer salt, the IEX material has a lower affinity to the first cationic ion species than to the hardness, the IEX material is loaded with a second cationic ion species deriving from a regenerant salt, and the IEX material has a lower affinity to the second cationic ion species than to the first cationic ion species.

We also provide a method of operating the water softening device including a filter configured to remove hardness from a first stream of raw water to produce a second stream of softened water, wherein the filter includes an ion exchange material, the IEX material is loaded with a first cationic ion species deriving from a tracer salt, the IEX material has a lower affinity to the first cationic ion species than to the hardness, the IEX material is loaded with a second cationic ion species deriving from a regenerant salt, and the IEX material has a lower affinity to the second cationic ion species than to the first cationic ion species, wherein a first stream of raw water is passed through a filter including an IEX material configured to remove hardness from the first stream of raw water, thereby producing a second stream of softened water, the IEX material is loaded with the first cationic ion species, the IEX material is loaded with the second cationic ion species, and an electrical property of the second stream is monitored by a sensor.

DETAILED DESCRIPTION

Figure 1:
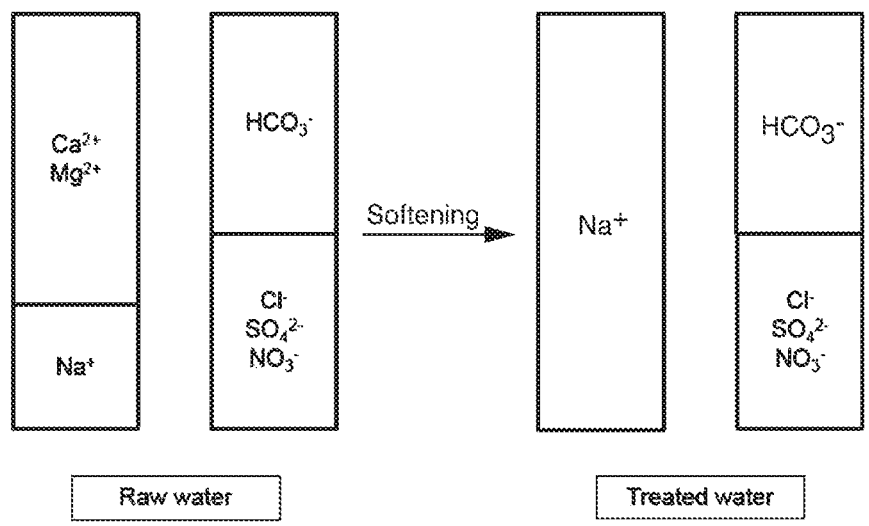
FIG. 1 illustrates schematically the general process of ion exchange during operation of a water softening device containing a filter comprising an IEX resin operated in $Na^+$ mode.

We found that by using an IEX material modified by applying specific regeneration conditions, it is possible to identify the point when a filter is exhausted and hardness breakthrough will occur and trigger a regeneration of the used IEX material. This allows for use of the complete IEX material capacity, resulting in a decrease of the amount of salt and waste water consumption compared to a standard softener operation mode.

Specific regeneration conditions means that, besides the regenerant salt, an additional tracer salt is used for the IEX material regeneration. This leads to an IEX material loaded with two different cationic ions species. The tracer salt must be chosen such that the IEX material shows an affinity to the cationic ions of the tracer salt which is lower than its affinity to hardness causing ions and higher than its affinity to the cationic ions of the regenerant salt. This means that during operation a chromatographic effect can gradually take place in the material bed. Once the IEX material is exhausted, the cationic ions of the regenerant salt are exchanged against hardness causing ions. However, prior to a hardness breakthrough the concentration of cationic ions of the tracer salt will increase in the water exiting from the filter with the modified IEX material. We found that this increase in concentration can be detected, in particular by monitoring electrical properties of the water.

Our water softening device comprises a filter configured to remove hardness from a first stream of raw water to produce a second stream of softened water. The term hardness is to be understood as hardness causing ions in the raw water.

The device is characterized by the following features:
The filter comprises an ion exchange (IEX) material,
the IEX material is loaded with a first cationic ion species deriving from a tracer salt,
the IEX material shows a lower affinity to the first cationic ion species than to the hardness,
the IEX material is loaded with a second cationic ion species deriving from a regenerant salt, and
the IEX material shows a lower affinity to the second cationic ion species than to the first cationic ion species.

It is preferred that the first cationic ion species and the second cationic ion species differ in their ionic molar conductivities. This can be very advantageous. As explained above, the increase in concentration of the cationic ions of the tracer salt can be detected by monitoring changes in the electrical properties of the second stream (the softened water). If the two ion species differ in their ionic molar conductivities, the changes will tend to be higher. This can facilitate detection.

For the sake of clarity: Molar conductivity is the conductivity of an electrolyte solution (e.g. a solution of dissolved salt) divided by the molar concentration of the electrolyte (the dissolved salt). It is the conducting power of all the ions produced by dissolving one mole of an electrolyte in solution. The unit of the molar conductivity are siemens per meter per molarity, or siemens meter-squared per mole.

It is preferred that the IEX resin material is an IEX resin.
In preferred examples, the water softening device comprises at least one of the following additional features:
The IEX material is a strong acid cationic (SAC) ion exchange (IEX) material, in particular a strong acid cationic (SAC) ion exchange (IEX) resin.
The raw water contains $Ca^{2+}$ and $Mg^{2+}$ as hardness causing ions.
The first cationic ion species is $K^+$ or $NH_4^+$.
The second cationic ion species is $Na^+$ or $Li^+$.
Particularly preferred are $K^+$ as first cationic ion species and $Na^+$ as second cationic ion species. The ionic molar conductivity of potassium is higher than the ionic molar conductivity of sodium. This will result in a conductivity peak as soon as all sodium ions have been exchanged, but prior to the hardness breakthrough. By detecting this conductivity peak it is possible to trigger the regeneration right before or at the moment the breakthrough occurs.

Further preferably, the water softening device comprises at least one of the following additional features:
The device comprises or is coupled to a regenerant tank.
The regenerant tank contains a regenerant comprising as a first salt the tracer salt and as a second salt the regenerant salt.
The tracer salt is potassium chloride (KCl).
The regenerant salt is sodium chloride (NaCl).
Regenerant tanks for water softening devices are commercially available. A suitable tank is described, for example, in EP 3103770 A1. It is possible that such a tank comprises a first salt with the first cationic ion species and a second salt with the second cationic ion species. Preferably the tank comprises an aqueous solution comprising the two salts in a dissolved state.

The amount of the first cationic ion species fixed on the IEX material compared to the amount of the second cationic ion species fixed on the IEX material will depend on the regenerant/tracer salt mix composition in the tank.

It is preferred that
the molar ratio between the first salt and the second salt in the regenerant tank is to 100,
preferably 1 to 25,
and/or
that 0.5% to 20%, preferably 2% to 8% of the capacity of the IEX material is loaded with the first cationic ion species
and/or that 80% to 99.5%, preferably 92% to 98% of the capacity of the IEX material is loaded with the second cationic ion species.

A good example is the use of a potassium salt as tracer salt and a sodium salt as regenerant salt. For example, by adding a defined amount of potassium chloride (KCl) to brine (NaCl) in the regenerant tank, the IEX material will be regenerated under the sodium and potassium form.

Further preferably, the water softening device comprises at least one of the following additional features:
The device comprises or is coupled to a first and to a second tank.
The first tank is a regenerant salt tank and comprises the regenerant salt (corresponding to the second salt above).
The second tank is a tracer salt tank and comprises the tracer salt (corresponding to the first salt above).
The first salt is potassium chloride (KCl).
The second salt is sodium chloride (NaCl).

Theoretically, it is also possible to provide the tracer salt in the form of an aqueous solution stored in the second tank and to mix it with an aqueous solution of the regenerant salt stored in the first tank, thereby providing a regenerant mixture consisting of the two aqueous solutions. However, in practice, it is preferred to flush an IEX material during a regeneration first with an aqueous solution of the regenerant salt from the first tank and then, in a second step, with an aqueous solution of the tracer salt from the second tank.

Preferably, the water softening device comprises at least one of the following additional features:
The device comprises a first sensor for monitoring an electrical property of the first stream.
The first sensor is configured to monitor an electrical conductivity and/or an electrical resistance.
The first sensor is configured as an electrolytic cell capable of applying a current to the first stream.
The device comprises a second sensor for monitoring an electrical property of the second stream.
The second sensor is configured to monitor an electrical conductivity and/or an electrical resistance.
The second sensor is configured as an electrolytic cell capable of applying a current to the second stream.

Generally it is preferred that the first sensor and the second sensor are configured to measure an electrical conductivity. Sensors suitable for measuring the electrical conductivity of water, in particular electrolytic cells suitable for measuring the electrical conductivity of water, are known to those skilled in the art and need no further explanation.

Further preferably, the device comprises a third sensor that measures the volume of water which flows through the filter.

Further preferably, the water softening device may be characterized by at least one of the following additional features:
The device comprises an electronic control unit which is connected to the first sensor and to the second sensor.
The electronic control is further connected to the third sensor.
The electronic control unit comprises an internal data memory and a data processing unit.

It is preferred that the device is characterized by a combination of all of these features.

Further preferably, the water softening device may be characterized by at least one of the following additional features:

The device comprises a bypass line for mixing the second stream of softened water with raw water of the first stream.
The bypass line comprises a valve to regulate the amount of water of the first stream mixed to the second stream.

Via the bypass line the second stream can be blended with water of the first stream.

The method operates a water softening device. Preferably the device operated according to this method is a device like the one described above. It comprises the steps of
passing a first stream of raw water through a filter comprising an IEX material, wherein the filter, in particular the IEX material, is configured to remove hardness from the first stream of raw water, thereby producing a second stream of softened water,
loading the IEX material with a first cationic ion species,
loading the IEX material with a second cationic ion species, and
monitoring an electrical property of the second stream by a sensor.

The properties and preferred examples of the IEX material, the first cationic species, the second cationic species and the electric properties of the second stream of water have already been discussed in the context with the description of the device. For example, also in connection with the method the first cationic ion species and the second cationic ion species are chosen such that the IEX resin has a higher affinity to the first cationic ion species than to the second cationic ion species and the first cationic ion species and the second cationic ion species preferably differ in their ionic molar conductivities.

It is preferred that
the monitored electrical property is the electrical conductivity or the electrical resistance of the second stream and/or
a change in the monitored electrical property is used as an indicator for the exhaustion state of the filter.

It is particularly preferred that the method may be characterized by at least one of the following additional steps or features:
The device comprises or is coupled to a regenerant tank (in particular a tank as described above).
A change of the monitored electrical property triggers a regeneration process comprising flushing the filter comprising the IEX material with regenerant from the regenerant tank.
The regenerant contains a tracer salt comprising the first cationic species.
The device comprises or is coupled to a tracer salt tank.
A change of the monitored electrical property triggers a regeneration process comprising flushing the filter in a first step with regenerant from the regenerant tank and in the second step with tracer salt from the tracer salt tank.

It is preferred that the method is repeated cyclically. A complete cycle is composed of a phase of regular operation and a regeneration step. Thus, each regeneration step is followed by a phase of regular operation and—vice versa—each phase of regular operation is followed by a regeneration step. The phase of regular operation ends when the filter or—more particularly—the IEX material contained therein—is exhausted. This time point is indicated by the change in the monitored electrical property discussed above. More detailed, this time point is reached when the monitored change of the electrical property reaches a maximum or a minimum. For example, this is when the monitored electrical conductivity of the second stream exiting a filter containing an IEX material which is loaded with $K^+$ as the first cationic ion species and $Na^+$ as the second cationic ion species reaches a maximum due to the increase of $K^+$ ions in the stream.

Preferably, the method comprises at least one of the following additional steps:

The filter is cyclically regenerated, wherein during each regeneration a certain percentage of the capacity of the IEX material is loaded with the first cationic ion species and a certain percentage of the capacity of the IEX material is loaded with the second cationic ion species.

After each regeneration, during the phase of regular operation, the first stream of raw water is passed through the filter and the electrical property of the second stream is monitored until the change in the electrical property of the stream which indicates that the filter is exhausted reaches a maximum or a minimum.

The volume of water $V_{SW}$ passing through the filter during the phase of regular operation is metered, preferably by the third sensor mentioned above.

In a possible next step, the raw water hardness $TH_{RW}$ can be determined as a function of the volume of the metered amount of water $V_{SW}$ and the specific capacity of the IEX material $C_{IEX}$ and the volume $V_{IEX}$ of the ion exchange material.

The following equation gives results with a relatively good accuracy, in particular if 2% to 8% of the capacity of the IEX material is loaded with the first cationic ion species:

$$TH_{RW}=C_{IEX}*V_{IEX}/V_{SW}.$$

Further preferably, the method comprises at least one of the following additional steps, preferably even all of the following additional steps:

The second stream of softened water is mixed with raw water of the first stream via a bypass line.

The ratio of the first stream and the second stream is kept constant during the phase of regular operation.

The ratio of the first stream and the second stream is adjusted at the end of the phase of regular operation in dependence of the monitored change in the electrical property of the second stream.

The adjustment can be automatically controlled by the electronic control unit.

Further features and advantages can be derived from the figures and the following detailed description of preferred examples. The preferred examples described are merely for the purposes of illustration and to give a better understanding and shall not in any way constitute a restriction.

(1) General Process of Ion Exchange with a SAC IEX Resin Operated in $Na^+$ Mode For most natural water encountered, the total hardness TH corresponds to the sum of the concentrations of $Ca^{2+}$ and $Mg^{2+}$ ions in the water. For example, water containing $Ca^{2+}$ treated over a SAC resin bed operated under $Na^+$ form, would react as follow:

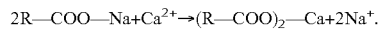

The $Na^+$ ions fixed on the SAC resin are exchanged against hardness ($Ca^{2+}$ and $Mg^{2+}$). The process is illustrated in FIG. 1.

(2) Preferred Example of a Device

Figure 2:
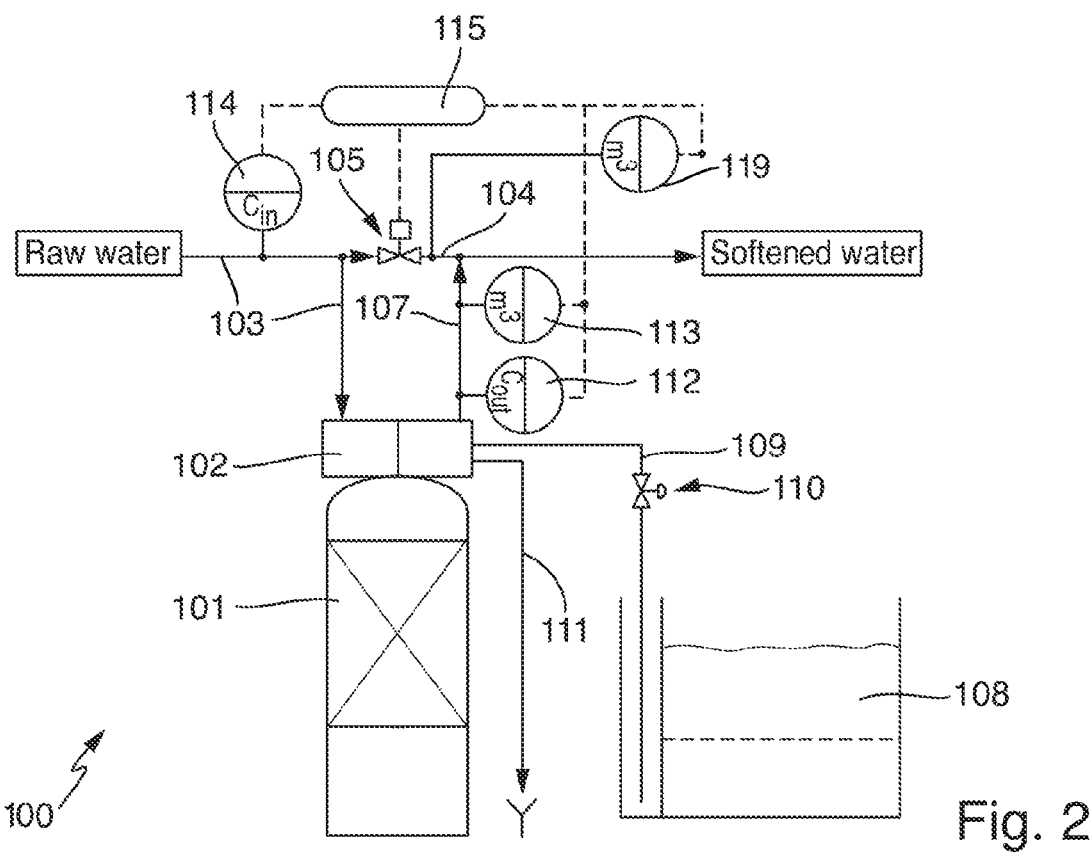
FIG. 2 illustrates schematically a preferred example of a water softening device.

The device 100 shown in FIG. 2 comprises a filter 101 containing a SAC IEX resin and a brine tank 108 containing brine. On the top of the filter 101 a filter head 102 is installed. This filter head 102 comprises a multiway valve or a combination of valves. The multiway valve or the combination of valves regulate all streams from and to the filter 101, including a stream of raw water to the filter 101 and a stream of softened water which exits from the filter 101. Via the valve or the combination the filter 101 is further connected to the brine tank 108.

The IEX resin in the filter 101 has to be regenerated in intervals. In the course of the regeneration saturated brine is passed from the brine tank 108 via line 109 (which includes a valve 110) and the filter head 102 into the filter 101, flushing the resin bed therein. The brine contains—besides the main regenerant salt sodium chloride—as a tracer salt dissolved potassium chloride. It is preferred to dilute the brine in the filter head 102 with water before flushing the resin bed, for example, with raw water from line 103. For example, it is preferred to adjust the salt concentration in the brine to a value of about 10% by weight. Used brine which exits from the filter 101 can be discarded via line 111. After regeneration usually from 2% to 8% of the capacity of the IEX resin is loaded with potassium, the rest with sodium ions. The exact value depends on the regeneration conditions and on the composition of the brine.

Raw water enters into the filter head 102 via line 103. A stream of softened water exits from the filter head 102 via line 107. There is a direct bypass line 104 which directly connects lines 103 and 107. Water which has exited from the filter 101 can be blended with raw water via the bypass line 103. The amount of raw water can be regulated via valve 105.

The device 100 comprises two sensors 112 and 114 for measuring electrical conductivity of the water flowing through the device. Sensor 112 is positioned at the outlet line 107. Sensor 114 is positioned at the inlet line 103. In addition to this, device 100 comprises sensors 113 and 119 for measuring the volume of the water which flows through the filter 101 and though the bypass line 104. The sensors 112, 113, 114 and 119 are connected to an electronic control unit 115.

(3) Further Preferred Example of a Device

Figure 3:
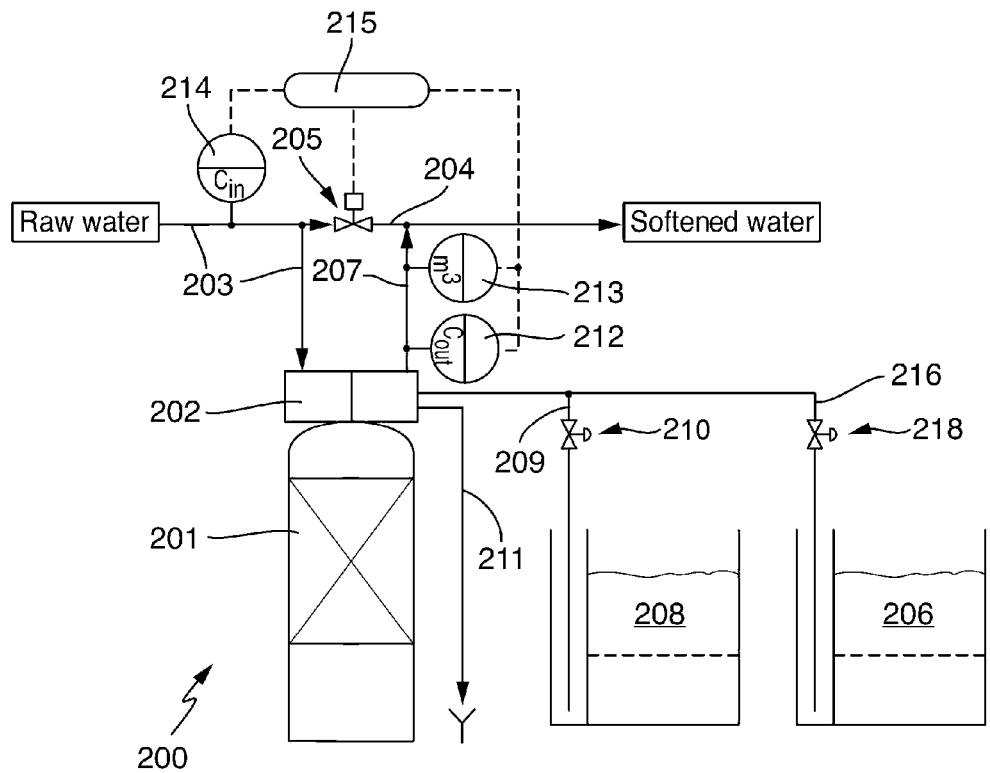
FIG. 3 illustrates schematically a further preferred example of a water softening device.

The device 200 shown in FIG. 3 comprises a filter 201 containing a SAC IEX resin, a brine tank 208 containing an aqueous solution of sodium chloride as regenerant salt and a tracer salt tank 206 comprising an aqueous solution of potassium chloride as a tracer salt. On the top of the filter 201 a filter head 202 is installed. This filter head 202 comprises a multiway valve or a combination of valves. The multiway valve or the combination of valves regulate all streams from and to the filter 201, including a stream of raw water to the filter 201 and a stream of softened water which exits from the filter 201. Via the valve or the combination the filter 201 is further connected to the brine tank 208 and the tracer salt tank 206.

The IEX resin in the filter 201 has to be regenerated in intervals. In the course of the regeneration an aqueous solution of sodium chloride is first passed from the brine tank 208 via line 209 (which includes a valve 210) via the filter head 202 into the filter 201, flushing the resin bed therein. Then, in a second step, an aqueous solution of potassium chloride is passed from the tracer salt tank 206 via line 216 (which includes a valve 218) via the filter head 202 into the filter 201.

It is preferred to dilute the aqueous solution of sodium chloride and/or the aqueous solution of the tracer salt in the filter head 202 with water before flushing the resin bed, for example, with raw water from line 203. For example, it is preferred to adjust the salt concentration in the brine to a value of about 10% by weight. Used regenerant which exits from the filter 201 can be discarded via line 211. After regeneration usually from 2% to 8% of the capacity of the IEX resin is loaded with potassium, the rest with sodium ions. The exact value depends on the regeneration conditions and on the composition of the aqueous solution of the tracer salt.

Raw water enters into the filter head 202 via line 203. A stream of softened water exits from the filter head 202 via line 207. There is a direct bypass line 204 which directly connects lines 203 and 207. Softened water which has exited from the filter 201 can be blended with raw water via the bypass line 204. The amount of raw water can be regulated via valve 205.

The device 200 comprises two sensors 212 and 214 for measuring electrical conductivity of the water flowing through the device. Sensor 212 is positioned at the outlet line 207. Sensor 214 is positioned at the inlet line 203. In addition to this, device 200 comprises a sensor 213 that measures the volume of the water flowing through the filter 201. The sensors 212, 213 and 214 are connected to an electronic control unit 215.

(4) Detailed Description of a Preferred Example of our Method

Our method is in particular characterized by the use of a regenerant containing a tracer salt for the IEX resin regeneration. The nature of this salt and especially the resin selectivity to this salt is of importance. To obtain the desired effect, the selectivity from the IEX resin to the tracer salt should be located between the selectivity for the salt used for regeneration (usually a sodium salt) and the selectivity for hardness ($Mg^{2+}$ and $Ca^{2+}$). For a SAC resin the affinity/selectivity order is as follow for the most common species:

$Li^+ < H^+ < Na^+ < NH_4^+ < K^+ < Mg^{2+} < Ca^{2+}$.

For a softener regenerated with a sodium salt (with $Na^+$ ions), a potassium salt (with $K^+$ ions) would respect the previous condition as its selectivity is located between the selectivity for sodium ions ($Na^+$) and hardness ($Mg^{2+}$ and $Ca^{2+}$). The ammonium ion ($NH_4^+$) would also respect the condition, therefore an ammonium salt could also be used as a tracer salt. In fact, any salt whose selectivity is located between the hardness and the selectivity of the regenerant salt could be used as a tracer salt.

The cations of the tracer salt get fixed on the IEX resin during the regeneration and especially during the brining step. During this step, the IEX resin is flushed with brine from a brine tank. The aim at the end of the regeneration is to obtain from 0.5 to 20% tracer salt loading, with regard to the IEX resin operating capacity.

There are two different approaches to bring the tracer salt in contact with the IEX resin. The first approach is to mix the tracer salt to the brine solution in a brine tank. This approach is preferred for domestic applications. The second approach is to install (besides a brine tank) a second tank containing the tracer salt, for example, in the form of an aqueous solution. This approach is preferred for industrial applications.

For a regeneration with a sodium salt as regenerant salt under domestic conditions (~90 g NaCl per liter IEX resin) usually the regeneration efficiency is about 60% for sodium. That means for 1 mol of sodium salt passed through a filter with the IEX resin, around 0.6 mol is fixed on the IEX resin. When using a regenerant containing a regenerant salt and a tracer salt the regeneration efficiency for the tracer salt is lower than for the regenerant salt. For example, to get a 5% potassium loading with regard to the IEX resin capacity, the regeneration efficiency to the potassium is around 45% (when using 90 g NaCl per liter IEX resin). Despite of the fact that the selectivity of the resin for potassium is higher, the higher brine concentration makes the selectivity for the tracer salt lower in those conditions, during the regeneration.

For a regeneration with a sodium salt as regenerant salt under industrial conditions usually brine from the brine tank is passed first through the IEX resin bed. The tracer salt is brought to the IEX resin in a second step, once the IEX resin has been regenerated with the regular regenerant salt. At the moment the tracer salt is brought to the IEX resin, there is no more a competition between both salts. In this case the IEX resin regenerated with the regular regenerant salt shows a higher affinity for the tracer salt and the regeneration efficiency to the tracer salt is close to 100%.

To understand what happens to an IEX resin bed (which has been regenerated with a regenerant salt and a tracer salt) during a regular operation, the following example is given: A filter is filled with 25 liters of an SAC IEX resin. The regular regenerant for such a filter is NaCl, with a regenerant level of 90 g NaCl per liter IEX resin for a domestic application, resulting in a raw IEX resin operating capacity of 1.1 eq/l. As a tracer salt KCl was chosen. The regeneration conditions were set to get 5% of the IEX resin capacity loaded with $K^+$. The raw water contained 26° f of total hardness. The detailed raw water composition is given below:

T=15° C.
pH=7.6
$Ca^{2+}$=2.39 mmol/l
$Mg^{2+}$=0.21 mmol/l
$Na^+$=0.29 mmol/l
$K^+$=0.06 mmol/l
$NO_3^-$=0.25 mmol/l
$Cl^-$=0.25 mmol/l
$SO_4^{2-}$=0.36 mmol/l
Alkalinity=4.88 mmol/l.

Figure 4:
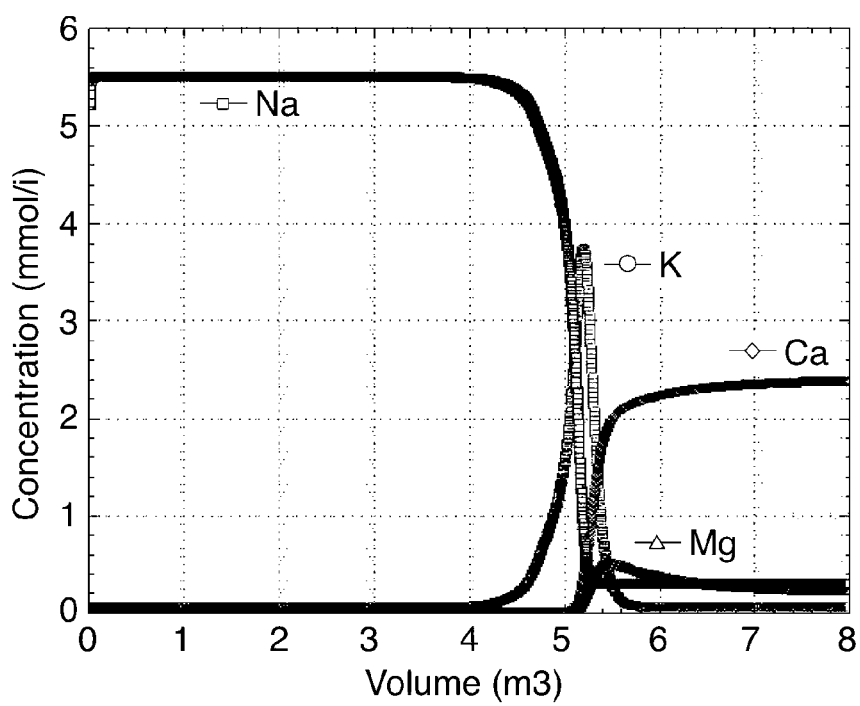
FIG. 4 illustrates the changes in concentrations of the cations $Na^+$, $Ca^{2+}$, $Mg^{2+}$ and $K^+$ in softened water exiting the filter of a water softening device as a function of volume passing through the filter.

Inside the filter the flow rate was configured to 630 l/h (with a velocity of 19.6 m/h). The changes in concentrations of the cations $Na^+$, $Ca^{2+}$, $Mg^{2+}$ and $K^+$ in the softened water exiting the filter were monitored. The results are shown in FIG. 4.

Figure 5:
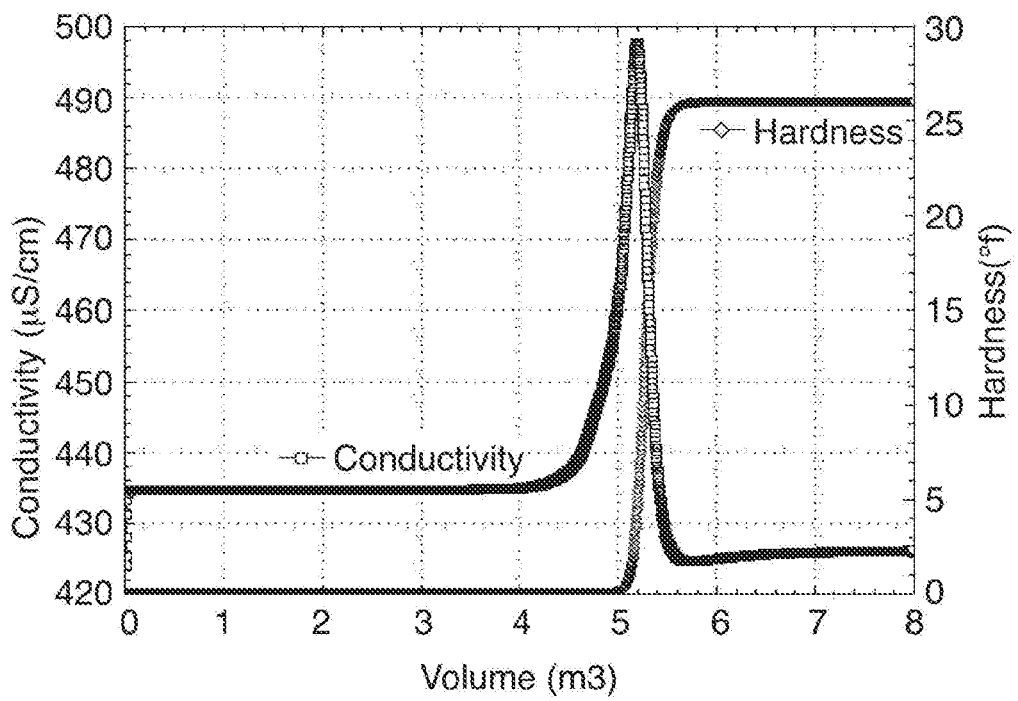
FIG. 5 illustrates the electrical conductivity of softened water exiting the filter of a water softening device and the concentration of hardness therein as a function of volume passing through the filter.

In accordance with the IEX resin selectivity of the ions $Na^+$, $Ca^{2+}$, $Mg^{2+}$ and $K^+$ a chromatographic effect was observed. The tracer salt ($K^+$) whose selectivity is located between the selectivity of the regenerant salt ($Na^+$) and the selectivity of the hardness ($Ca^{2+}$ and $Mg^{2+}$) was released prior to the hardness breakthrough but only after the $Na^+$ concentration started to decrease significantly. This resulted in a change of conductivity of the water exiting the filter as shown in FIG. 5.

The peak of electrical conductivity corresponds to the concentration of potassium ions in the water exiting the filter. The fact that the conductivity increases with the potassium concentration can be explained by the ionic molar conductivity of each species. Sodium ions have an ionic molar conductivity of 5.01 $S \cdot m^2 \cdot mol^{-1}$ against 7.35 $S \cdot m^2 \cdot mol^{-1}$ for potassium ions. As the potassium ions show a higher ionic molar conductivity, this explains why the electrical conductivity is increasing once sodium ions start to be replaced by potassium ions at the end of the filter's capacity. The potassium peak indicates that a hardness breakthrough is imminent.

Thus, it is possible to detect the hardness breakthrough by monitoring the conductivity at the outlet of the filter, in particular by detecting the conductivity peak. Our method can focus on the outlet conductivity exclusively with only one sensor at the filter's outlet, or on the conductivity ratio from outlet to inlet with a conductivity sensor on the inlet of the filter and another one installed on the outlet (compare FIG. 2: conductivity sensor 112 is positioned downstream of the filter, conductivity sensor 114 is positioned upstream of the filter). The second configuration is of particular interest in fluctuating raw water conditions to make sure a softened water conductivity peak linked to some raw water changes would not be interpreted by the device as a hardness breakthrough.

A water softening device suitable for an industrial application is shown in FIG. 3. For an industrial application the bypass 204 between the raw and softened water is either closed or absent. The required hardness level downstream of the water softening device is preferably 0° f.

Figure 6:
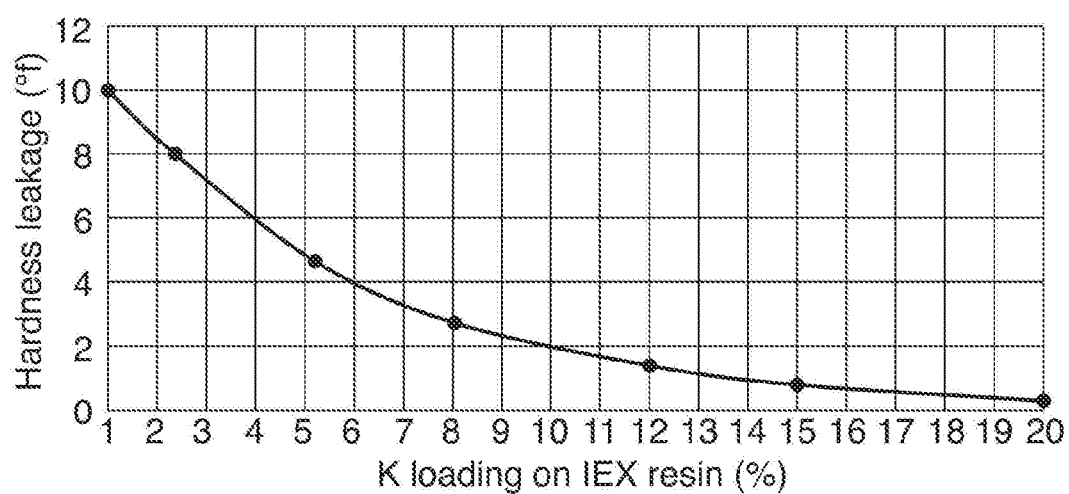
FIG. 6 illustrates the hardness concentration at the conductivity peak measured in water exiting the filter of a water softening device as a function of the loading of an IEX resin with a tracer salt.

For a given raw water hardness concentration, the hardness leakage concentration at the conductivity peak measured at the outlet line 207 is directly linked to the amount of tracer salt fixed on the IEX resin during the regeneration. The curve in FIG. 6 illustrates the hardness concentration at the conductivity peak measured at the outlet line 207 as a function of the loading of an IEX resin with a tracer salt.

From this curve it is apparent that depending on the amount of tracer salt involved, the hardness leakage at the conductivity peak can be controlled for a given raw water hardness concentration. In an industrial application, the usual configuration is to have a polisher softener downstream a first water softening device. Despite the fact that the hardness level in the softened water should remain at 0° f, it is therefore possible to let a limited hardness leakage at the outlet of the first water softening device. In the presence of a polisher softener, the leakage will be taken by the polisher.

This leads to the conclusion that once the raw water hardness is known, the amount of tracer salt involved during the regeneration can be set to the required level to obtain the desired hardness leakage at the end of each cycle when the conductivity peak occurs. For example, if raw water is characterized by a constant hardness of 26° f and the target hardness is 2° f, again at the end of each cycle when the conductivity peak occurs, a tracer salt loading (as $K^+$) on the IEX resin of 10% would be appropriate. In this case, the tracer salt quantity involved during the regeneration would be set to obtain a 10% loading on the IEX resin. As the regeneration efficiency to the tracer salt in this configuration is close to 100%, the amount a tracer salt to be involved can be clearly defined to match the target leakage condition at the end of each cycle when the conductivity peak occurs.

Domestic Application

The water softening device according to FIG. 2 is in particular suitable for a domestic application. Inter alia it comprises a sensor 113 for measuring the amount of the water which flows through the filter 101.

Such a sensor allows to determine the volume of water $V_{SW}$ passed through the filter in the time between the previous regeneration and the moment when the conductivity peak shown in FIG. 5 occurs. As the regenerant level used during the previous regeneration is known, the capacity from the IEX resin is also known. From the volume of water, the IEX capacity and the volume of ion exchange resin it is then possible to estimate the raw water hardness concentration with a relatively good accuracy according to the following calculation:

$$TH_{RW} = C_{IEX} * V_{IEX}/V_{SW}$$

wherein $V_{SW}$ is the volume of water treated until the monitored conductivity reaches a maximum [l],
$C_{IEX}$ is the specific capacity of the IEX resin [eq.]
$V_{IEX}$ is the volume of the IEX resin volume in the filter [l]

$TH_{RW}$ is the total hardness ($[Ca^{2+}]+[Mg^{2+}]$) in the raw water [meq.*$l^{-1}$].

According to the curve in FIG. 5 the conductivity peak occurs at 5.2 m³. In this case the raw water hardness estimation would give:

$$TH_{RW} = 1.1*25/5200 = 5.28 \text{ meq} \cdot l^{-1} \approx 26.4° \text{ f.}$$

For a raw water hardness of 26.0° f, the estimation at 26.4° f according to the previous method would give the raw water hardness with an accuracy of 1.5% in this example, for a 5% tracer salt loading on the IEX resin.

Once the raw water hardness is known after a first regeneration with a tracer salt, the bypass can be adjusted via the valve 105, for example, automatically by the controller 115, to get the desired hardness concentration in the softened water. In a domestic application the target value is located from 8 to 12° f. The set point can be entered by the user and the bypass will adjust itself automatically to get the set hardness value. To do so an additional sensor to determine the volume of water passed through the bypass line 104 would be required. With such a sensor the amount of raw water mixed with the softened water can be adjusted to the required level.

It has been explained above that for a given raw water hardness and a given salt tracer loading on the IEX resin, it is possible to determine the hardness leakage concentration at the conductivity peak. At the end of each cycle, when the conductivity starts to rise, it is therefore possible to link the conductivity increase to the hardness leakage increase. Under those conditions, the bypass setting can be automatically adjusted that the valve 105 will gradually close to maintain the hardness level downstream the device at a constant level.

This allows exhaustion of the IEX resin bed until the point the hardness level at the vessel outlet reaches the value set for the mixed water, that the maximum volume of water can be treated by the IEX resin. This point should be reached and the regeneration triggered when the bypass valve will be fully closed and the hardness leakage has reached the set value.

The invention claimed is:

1. A water softening device comprising a filter configured to remove hardness from a first stream of raw water to produce a second stream of softened water, wherein:

The filter comprises an ion exchange material (IEX),

The IEX material is loaded with a first cationic ion species deriving from a tracer salt, The IEX material has a lower affinity to the first cationic ion species than to the hardness, The IEX material is loaded with a second cationic ion species deriving from a regenerant salt, The IEX material has a lower affinity to the second cationic ion species than to the first cationic ion species, and 2%-8% of a capacity of the IEX material is loaded with the first cationic ion species and 92% to 98% of the capacity of the IEX material is loaded with the second cationic ion species.

2. The water softening device according to claim 1, wherein the first cationic ion species and the second cationic ion species differ in their ionic molar conductivities.

3. The water softening device according to claim 1, wherein at least one of:

the IEX material is a strong acid cationic (SAC) ion exchange (IEX) resin, the raw water contains $Ca^{2+}$ and $Mg^{2+}$ as hardness causing ions, the first cationic ion species is $K^+$ or $NH_4^+$,
the second cationic ion species is $Na^+$ or $Li^+$,
0.5% to 20% of the capacity of the IEX material is loaded with the first cationic ion species, and
99.5% to 80% of the capacity of the IEX material is loaded with the second cationic ion species.

4. The water softening device according to claim 1, wherein at least one of:
the device comprises or is coupled to a regenerant tank,
the regenerant tank contains a regenerant comprising as a first salt the tracer salt and as a second salt the regenerant salt,
the tracer salt is potassium chloride (KCl), and
the regenerant salt is sodium chloride (NaCl).

5. The water softening device according to claim 1, wherein one of:
the device comprises or is coupled to a first and to a second tank,
the first tank is a regenerant salt tank and comprises the regenerant salt,
the second tank is a tracer salt tank and comprises the tracer salt,
the tracer salt is potassium chloride (KCl), and
the regenerant salt is sodium chloride (NaCl).

6. The water softening device according to claim 1, wherein one of:
the device comprises a sensor that monitors an electrical property of the first stream,
the sensor that monitors an electrical property of the first stream is configured to monitor an electrical conductivity and/or an electrical resistance, and
the sensor that monitors an electrical property of the first stream is configured as an electrolytic cell capable of applying a current to the first stream.

7. The water softening device according to claim 6, wherein at least one of:
the device comprises a second sensor that monitors an electrical property of the second stream,
the second sensor is configured to monitor an electrical conductivity and/or an electrical resistance, and
the second sensor is configured as an electrolytic cell capable of applying a current to the second stream.

8. The water softening device according to claim 1, wherein one of:
the device comprises a sensor that monitors an electrical property of the second stream,
the sensor that monitors an electrical property of the second stream is configured to monitor an electrical conductivity and/or an electrical resistance, and
the sensor that monitors an electrical property of the second stream is configured as an electrolytic cell capable of applying a current to the first stream.

9. The water softening device according to claim 1, wherein the device comprises a sensor that measures the volume of water which flows through the filter.

10. A water softening device comprising a filter configured to remove hardness from a first stream of raw water to produce a second stream of softened water, wherein
the filter comprises an ion exchange material,
the IEX material is loaded with a first cationic ion species deriving from a tracer salt,
the IEX material has a lower affinity to the first cationic ion species than to the hardness,
the IEX material is loaded with a second cationic ion species deriving from a regenerant salt,
the IEX material has a lower affinity to the second cationic ion species than to the first cationic ion species,
0.5% to 20% of the capacity of the IEX material is loaded with the first cationic ion species, and
99.5% to 80% of the capacity of the IEX material is loaded with the second cationic ion species.

11. A method of operating the water softening device according to claim 1, wherein
the first stream of raw water is passed through the filter comprising the IEX material configured to remove hardness from the first stream of raw water, thereby producing the second stream of softened water,
the IEX material is loaded with the first cationic ion species,
the IEX material is loaded with the second cationic ion species, and
an electrical property of the second stream is monitored by a sensor.

12. The method according to claim 11, wherein at least one of:
the monitored electrical property is the electrical conductivity or the electrical resistance of the second stream;
a change in the monitored electrical property is used as an indicator for the exhaustion state of the filter.

13. The method according to claim 12, wherein at least one of:
the device further comprises or is coupled to a tracer salt tank, and
a change of the monitored electrical property triggers a regeneration process comprising flushing the filter in a first step with regenerant from a regenerant tank and in a second step with the tracer salt from the tracer salt tank.

14. The method according to claim 11, wherein:
the filter is cyclically regenerated, wherein during each regeneration a certain percentage of the capacity of the IEX material is loaded with the first cationic ion species and a certain percentage of the capacity of the IEX material is loaded with the second cationic ion species,
after each regeneration, during a phase of regular operation, the first stream of raw water is passed through the filter and the electrical property of the second stream is monitored until the change in the electrical property of the stream which indicates that the filter is exhausted reaches a maximum or a minimum,
the volume $V_{SW}$ of water passing through the filter during the phase of regular operation is metered, and
raw water hardness $TH_{RW}$ is determined as a function of the volume of the metered amount of water $V_{SW}$ and the volume $V_{IEX}$ and the specific capacity $C_{IEX}$ of the IEX material.

15. The method according to claim 11, wherein at least one of:
the second stream of softened water is mixed with raw water of the first stream via a bypass line,
the ratio of the first stream and the second stream is kept constant during the phase of regular operation, and
the ratio of the first stream and the second stream is adjusted at the end of the phase of regular operation in dependence of the monitored change in the electrical property of the second stream.

16. The method according to claim 13, wherein at least one of:
the device comprises or is coupled to a regenerant tank,
a change of the monitored electrical property triggers a regeneration process comprising flushing the filter comprising the IEX material with regenerant from the regenerant tank, and the regenerant contains the tracer salt comprising the first cationic ion species.

* * * * *